US011524548B2

(12) United States Patent
Carbone et al.

(10) Patent No.: US 11,524,548 B2
(45) Date of Patent: Dec. 13, 2022

(54) AIR DISTRIBUTION ARRANGEMENT WITH INFLATABLE PIPES FOR AN AIR CONDITIONING UNIT

(71) Applicant: DENSO THERMAL SYSTEMS S.p.A., Poirino (IT)

(72) Inventors: Andrea Carbone, Poirino (IT); Fabrizio Nicole', Poirino (IT); Paolo Seja, Poirino (IT); Luca Crepaldi, Poirino (IT)

(73) Assignee: DENSO THERMAL SYSTEMS S.p.A., Poirino (IT)

( * ) Notice: Subject to any disclaimer, the term of this patent is extended or adjusted under 35 U.S.C. 154(b) by 344 days.

(21) Appl. No.: 16/878,222

(22) Filed: May 19, 2020

(65) Prior Publication Data
US 2020/0369112 A1 Nov. 26, 2020

(30) Foreign Application Priority Data
May 22, 2019 (IT) .................. 102019000007095

(51) Int. Cl.
*B60H 1/00* (2006.01)
(52) U.S. Cl.
CPC ..... *B60H 1/00564* (2013.01); *B60H 1/00028* (2013.01); *B60H 1/00521* (2013.01); *B60H 1/00842* (2013.01); *B60H 2001/00128* (2013.01)
(58) Field of Classification Search
CPC ............ B60H 1/00564; B60H 1/00028; B60H 1/00521; B60H 1/00842; B60H 2001/00128
See application file for complete search history.

(56) References Cited

U.S. PATENT DOCUMENTS

| 6,902,473 B1 * | 6/2005 | Goobeck ............ B60H 1/00564 454/903 |
| 2006/0172676 A1 | 8/2006 | Ebner et al. |
| 2012/0203311 A1 * | 8/2012 | Clemente .................. A61F 7/00 137/561 A |

FOREIGN PATENT DOCUMENTS

| FR | 2725404 A1 | 4/1996 |
| JP | 2001027444 A | 1/2001 |

OTHER PUBLICATIONS

Italian Search Report and Written Opinion for IT Patent Application No. 201900007095, dated Jan. 30, 2020, 8 pages.

\* cited by examiner

*Primary Examiner* — Marc E Norman
(74) *Attorney, Agent, or Firm* — Armstrong Teasdale LLP (57) ABSTRACT

An air distribution arrangement for an air conditioning unit is provided. The air distribution arrangement includes a main body coupled to a housing of the air conditioning unit, and provided with a distribution chamber fluidically connected to at least one air transport conduit formed within the housing of the air conditioning unit, and a plurality of distribution pipes connected to the main body and configured to be connected to respective air outlets for distributing air within a cabin of a vehicle. Each of the distribution pipes is flexible and at least partially inflatable due to an air flow within it.

7 Claims, 7 Drawing Sheets

AIR DISTRIBUTION ARRANGEMENT WITH INFLATABLE PIPES FOR AN AIR CONDITIONING UNIT

CROSS-REFERENCE TO RELATED APPLICATION

This application claims priority to and benefit of Italian Patent Application No. 102019000007095, filed May 22, 2019, the contents of which are incorporated by reference in their entirety.

FIELD OF THE INVENTION

The present invention refers to systems used in vehicles for distributing air treated by an air conditioning unit between different outlets positioned on a dashboard or within a vehicle cabin.

BACKGROUND OF THE INVENTION

These systems generally include a set of pipes configured to connect the air conditioning unit to the different outlets distributed within the cabin. In general, air distribution pipes are associated with flaps or similar shut-off devices to manage the distribution of air between the different pipes. The geometry of the air distribution pipes is defined by the car manufacturer in a more or less specific way for each individual model. On the other hand, the manufacturer of the air conditioning unit makes a unit suitable for working with the specific distribution geometry required by the vehicle manufacturer.

In general, the flow of air leaving an air conditioning unit has a certain stratification in temperature. Pipes connected to parts of the air conditioning unit in which the outlet flow is relatively hot are expected to bring air to specific areas of the cabin (for example the foot area), different from those to which pipes connected to parts of the air-conditioning unit where the outlet flow is relatively colder (for example, dashboard area) bring air. In known architectures, this places a constraint on the configuration of the outlets of the air conditioning unit. For example, if the outlet air flow in the air conditioning unit is relatively warmer at the top of the unit, it can be problematic to connect this part with the foot area outlet, while the lower part of the unit must be for example connected to the dashboard area outlet.

SUMMARY OF THE INVENTION

A purpose of the present invention is to increase the versatility of the air conditioning units. Another purpose is to reduce the number of parts as well as the number of assembly operations. A further purpose is to reduce manufacturing costs and packaging dimensions. A still further purpose is to provide an alternative way to manage air distribution.

Accordingly, the present invention provides an air distribution arrangement for an air conditioning unit, comprising
- a main body configured to be coupled to a housing of the air conditioning unit, and provided with a distribution chamber configured to be fluidically connected to at least one air transport conduit formed within the housing of the air conditioning unit,
- a plurality of distribution pipes connected to the main body and configured to be connected to respective air outlets for distributing air within a cabin of a vehicle, wherein each of said distribution pipes is flexible and at least partially inflatable due to an air flow within it, and
- a plurality of throttling members alternated with said distribution pipes and controllable to adjust air passage cross-section of the distribution pipes, in particular to selectively close or open the distribution pipes,
- wherein each distribution pipe is interposed between a respective pair of throttling members, at least one of which is movable to selectively move the throttling members towards each other or move the throttling members away from each other, and
- wherein a single throttling member is configured to adjust the air passage cross-section of two adjacent distribution pipes.

According to the present invention, the air conditioning unit is equipped with flexible pipes that allow a single model of air conditioning unit to be adapted to different installation situations, with a consequent increase in versatility compared to known solutions. The air conditioning unit may be supplied by the unit manufacturer together with the air distribution system, which can be adapted to the positioning geometry of the air outlets in the vehicle cabin.

In particular, the problem of outlet air flow stratification is solved thanks to the flexible pipes, which allow for example to connect high parts of the air conditioning unit with outlets positioned in relatively low areas of the cabin, and lower parts of the air conditioning unit with outlets positioned in relatively high areas of the cabin.

Furthermore, since the flexible pipes are, at least in part, tendentially floppy when they are not flown by an air flow, the size of the air conditioning unit with the distribution system can be relatively reduced, with consequent advantages for packing, transportation, handling and installation of the unit. The size can be further reduced in the event that the main body is also flexible and inflatable.

According to the present invention, a series of throttling members alternated with the distribution pipes is also provided. The distribution of air between the different pipes therefore is not managed by flaps or other relatively complex shut-off devices, but by simple parts movable or controllable to exert a crushing from the outside of the individual pipes.

Preferred embodiments of the present invention are also described.

Further characteristics and advantages of the arrangement according to the present invention will become more apparent from the following detailed description of some embodiments of the invention, made with reference to the attached drawings, provided for illustrative and not limitative purposes only.

DETAILED DESCRIPTION

Figure 1:
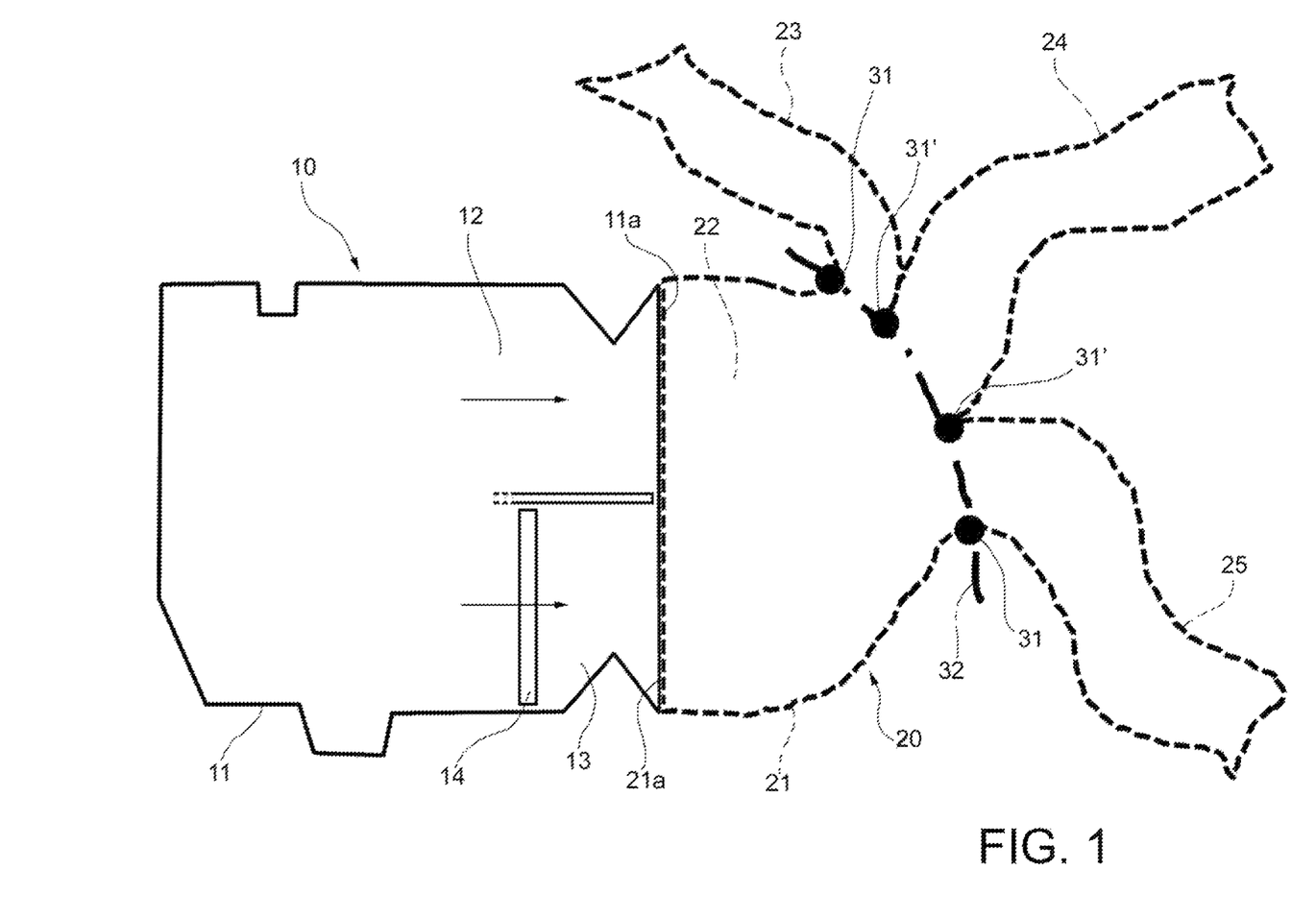
FIGS. 1 and 2 are a schematic sectional view and a schematic perspective view, respectively, of an air distribution arrangement according to a first embodiment of the invention.

FIG. 1 schematically represents an air conditioning unit, indicated with 10. The housing of the air conditioning unit, generally made of rigid plastic material, is indicated with 11. One or more conduits are formed within the housing 11 for transporting air treated by the air conditioning unit. For example, the figure shows two conduits, specifically a conduit for transporting unheated air, indicated with 12, and a conduit for transporting heated air, indicated with 13. Within the second conduit 13 there is a heater device, indicated with 14. Other conventional air treatment devices (not shown), such as evaporators or filters, may be present in the air-conditioning unit. In the unit there may also be movable members, such as flaps, controllable to route the air between different conduits. The unit is also conventionally associated with a fan (not shown) designed to generate an air flow within the conduits 12, 13 of the air conditioning unit 10.

As can be seen in FIG. 1, an air distribution arrangement, indicated by 20, is also associated with the air conditioning unit 10.

The arrangement 20 comprises a main body 21 coupled to the housing 11 of the air conditioning unit 10. Within the main body 21 there is formed an air mixing and distribution chamber 22 fluidically connected to the conduits 12, 13 formed within the housing 11 of the air conditioning unit 10. In particular, the housing 11 has an outlet mouth 11a to which an inlet mouth 21a of the main body 21 of the air distribution arrangement 20 is sealed.

Figure 2:
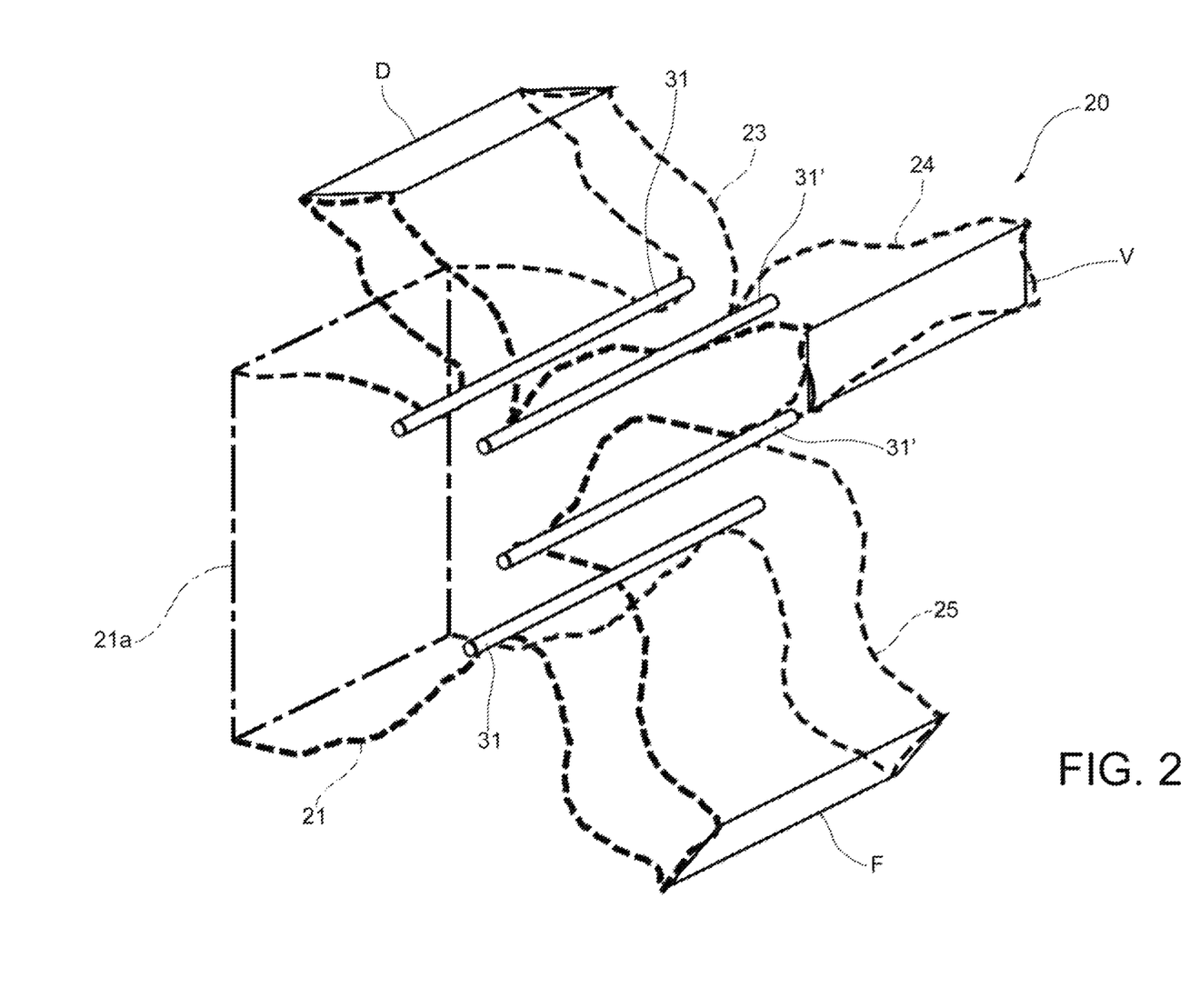

The arrangement 20 further comprises a plurality of distribution pipes 23, 24, 25 connected to the main body 21 and configured to be connected with respective air outlets D, V, F for distributing air within a cabin of a vehicle, shown in FIG. 2. The air outlet indicated by D and positioned on top of the dashboard below the windshield may be a defrost air outlet, dedicated to the defrosting/demisting of the windshield, the air outlet indicated with V may be a front ventilation air outlet positioned on the dashboard in front of the front seats, while the air outlet indicated with F may be a foot ventilation air outlet positioned at the bottom of the cabin. The number of air outlets and therefore of pipes may be different from that shown.

Each of the distribution pipes 23-25 is made of flexible material and is at least partially inflatable due to the passage of air within it. Consequently, each pipe 23-25 has generally loose walls when it is not flown by an air flow. Said walls stretch when the pipe is flown by an air flow. According to an embodiment not shown, the pipe may be entirely flexible, and have only a limited inflatable segment. This may be obtained by providing a pipe with a corrugated or reinforced part, and an inflatable part. The distribution pipes 23-25 can be of any material, or any combination of materials, which allows to have on one hand the flexibility of the pipe, and on the other hand the possibility for the pipe to swell when crossed by air. It is preferred that the pipe is inflatable only in correspondence with a limited portion of its length, i.e. that in which a respective throttling member is positioned. The throttling member will be described below.

Distribution pipes 23-25 may be multilayer pipes. Alternatively or in combination, the distribution pipes may comprise a layer formed of a fabric or a weave of fibers or threads. Alternatively or in combination, the distribution pipes may comprise a reinforcement, for example of metal wire or fiber, immersed in a matrix which constitutes the wall of the pipe, or coupled to the wall of the pipe. Alternatively or in combination, the distribution pipes may comprise at least one strand or reinforcing fiber arranged in a helix around the longitudinal axis of the pipe.

Preferred choice and arrangement of the materials used and/or the geometric and structural configuration of the pipe aim to prevent the walls of the pipe from collapsing at curves of the pipe, and in addition to avoid wall noise when the pipe is run through by the air flow.

The distal end of each flexible pipe may be fixed to the respective air outlet in a per se known way, for example by a snap ring, a cable tie or a clip.

In the embodiment of FIGS. 1 and 2, also the main body 21 is made of flexible material and is inflatable due to the passage of air within it.

The arrangement 20 may further comprise at least one throttling member respectively associated with each distribution pipe 23, 24, 25 and controllable to adjust the air passage cross-section of the distribution pipe, in particular to selectively close or open the distribution pipe. Control of the throttling members can comprise, in a completely conventional way, actuators and/or driving mechanisms (not shown).

In the illustrated example there are four throttling members 31, 31' made as bars, at least some of which, indicated with 31', can slide along a stationary support 32, represented in FIG. 1 as a dash-dotted line.

The throttling elements 31, 31' are configured to engage, in particular from the outside, the wall of the respective distribution pipes. The walls of the distribution pipes can be constrained (i.e. fixed) to the throttling members. In this way, each mobile throttling member 31' drags with it the part of the wall of the distribution pipe bound to the throttling member.

As can be seen in the figures, a series of throttling members 31, 31' is alternated with the distribution pipes 23-25. For each distribution pipe there is a pair of throttling members, 31, 31' or 31', 31', between which the distribution pipe is interposed. At least one of the members of the pair is movable to selectively bring the throttle members closer to each other or move the throttle members away from each other. In this way it is possible to adjust the air passage cross-section of the distribution pipes. Each of the central throttling members 31' in FIGS. 1 and 2 (i.e. those interposed between adjacent distribution pipes) is movable and allows to simultaneously adjust the passage cross-section of two adjacent distribution pipes. The lateral throttling members 31 may be stationary and serve as a stop for the movable throttling members 31'. The above-described configuration permits to move the movable throttling members 31' so that all three pipes leading to the openings D, V, F are open, or that only two of them, D-V, V-F or D-F, are open, or that only one of them, D, V or F, is open.

Figure 3:
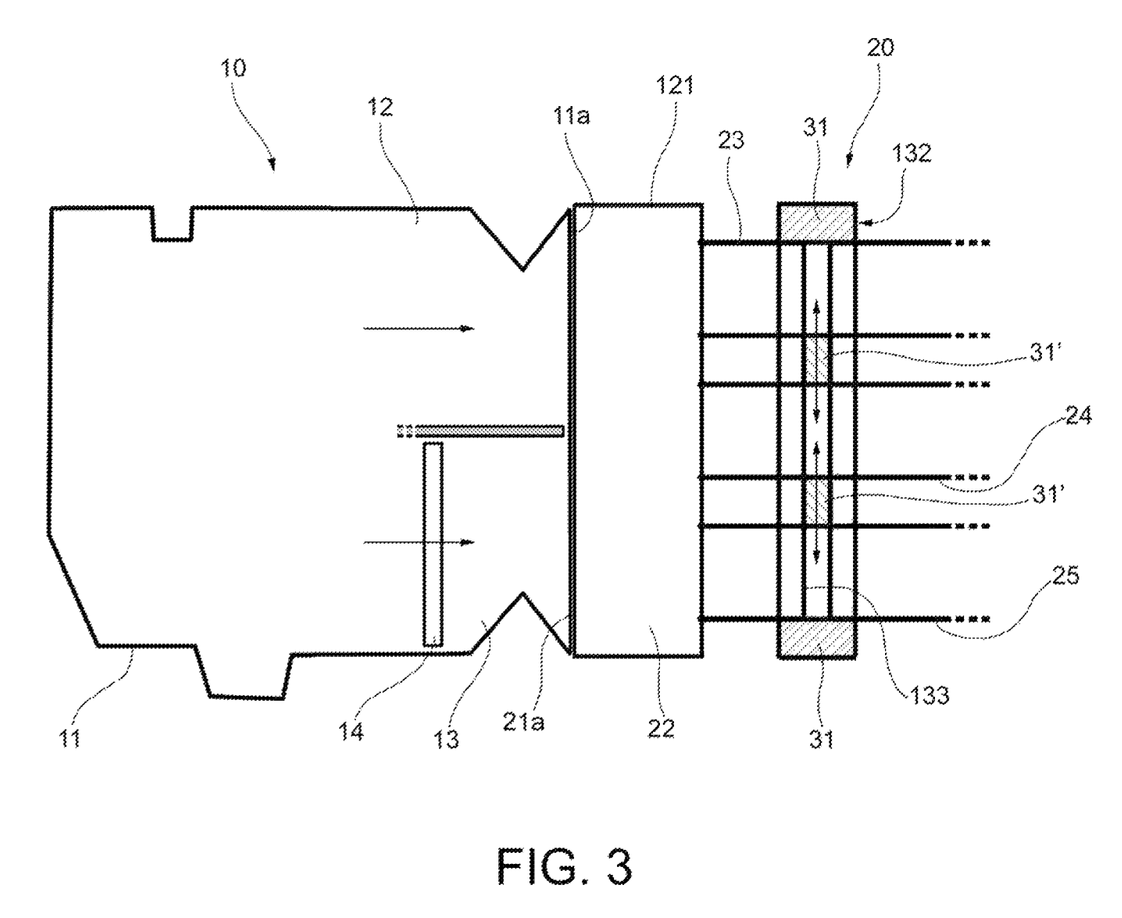
FIGS. 3 to 5 are respectively a schematic sectional view, a schematic perspective view and a partially sectioned view of an air distribution arrangement according to a second embodiment of the invention.
Figure 4:
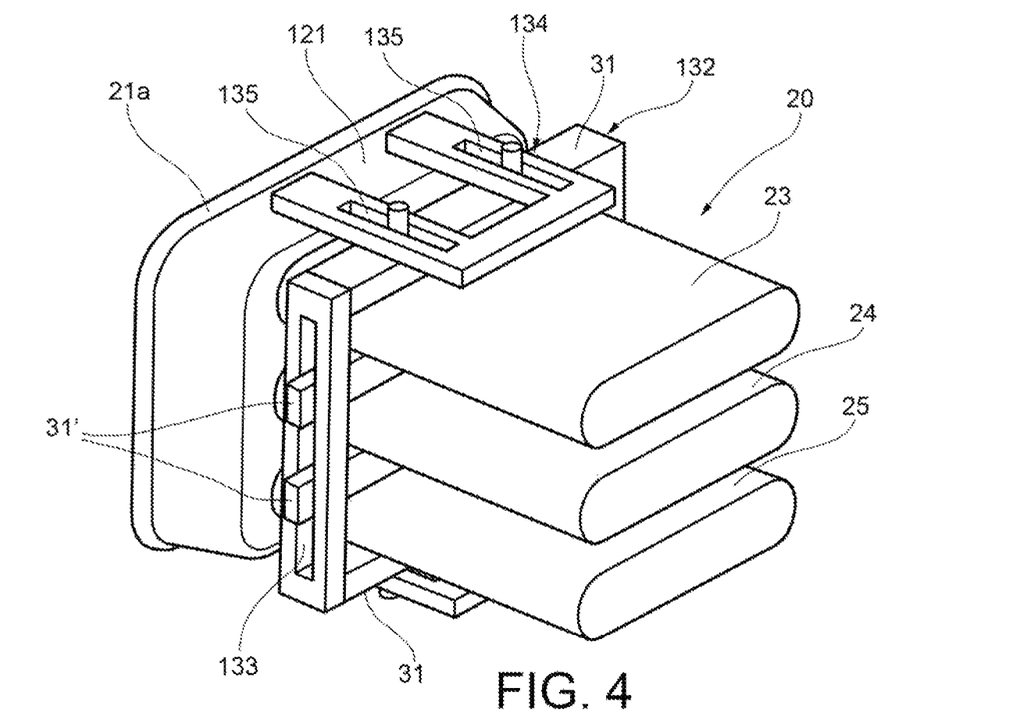
Figure 5:
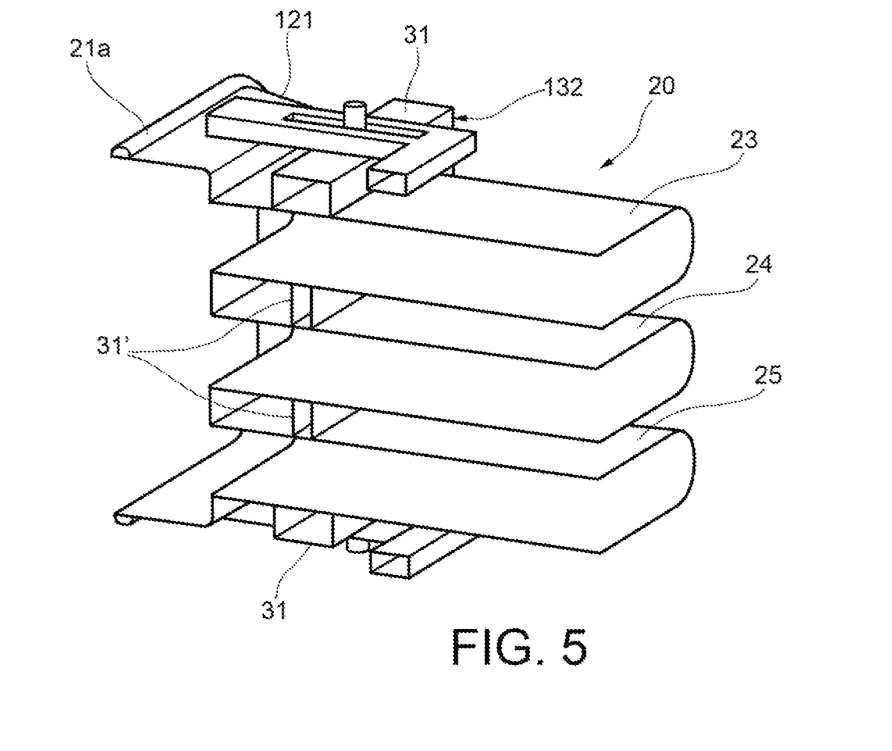

FIGS. 3 to 5 illustrate a second embodiment of the invention. The same reference numbers have been assigned to elements corresponding to those of the previous embodiment.

The embodiment of FIGS. 3-5 differs from the previous one essentially in that the main body, indicated with 121, is made of rigid material and carries a frame 132 on which the movable throttling members 31' are slidably mounted. For this purpose, guide grooves 133 may be formed in the frame 132. Opposite sides of the frame 132, indicated with 31, serve as stationary throttling members which cooperate with the movable throttling members 31' to selectively close or open the distribution pipes 23-25. The throttling members 31, 31' are arranged in a limited segment of the distribution pipes 23-25 at which these pipes are inflatable, and therefore correspondingly crushable. In this regard, the frame 132 may be connected to the main body 121 through a support 134 which allows to adjust the positioning of the frame 132 along the pipes 23-25, for example by adjustment grooves 135.

Figure 6:
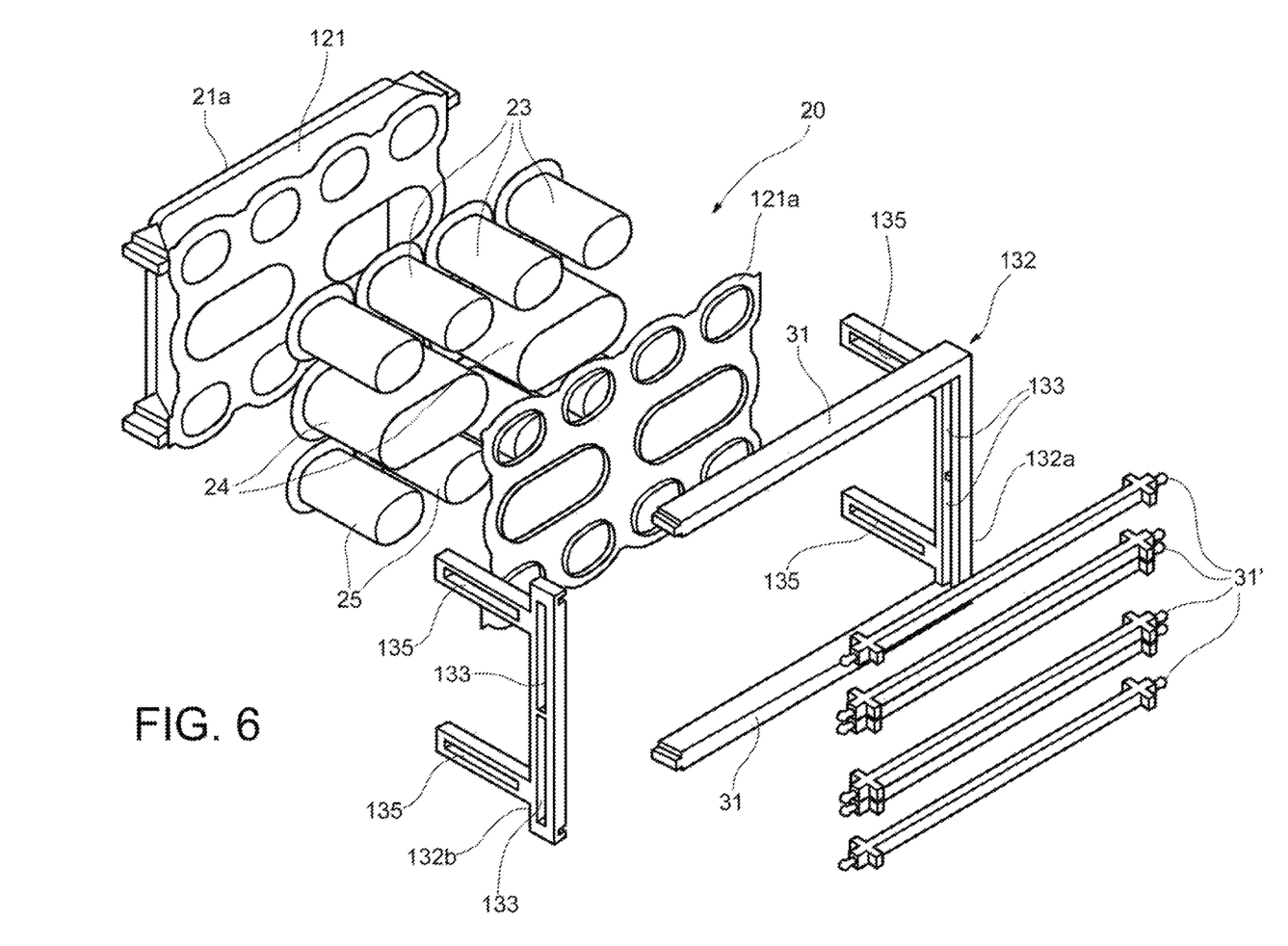
FIG. 6 is an exploded view of an air distribution arrangement according to a third embodiment.

FIG. 6 illustrates a third embodiment of the invention. The same reference numbers have been assigned to elements corresponding to those of the previous embodiments.

The embodiment of FIG. 6 differs from that of FIGS. 3-5 essentially in that it comprises a different number of pipes, essentially divided into three layers. The pipes of each layer can be dedicated to homologous areas of the cabin. For example, the pipes indicated with 23 can be connected to respective defrost air outlets, the pipes 24 can be connected to respective ventilation air outlets, and the pipes 25 can be connected to respective foot zone outlets. As shown in the example of FIG. 6, a plate 121a may be provided for fixing the pipes 23-25 to the main body 121. Furthermore, the frame 132 can be made of two parts 132a, 132b fixed together. The adjustment grooves 135 can also be formed directly on the frame 132. The methods of fastening the pipes 23-25 to the main body 121 and the structure of the frame 132 are however not essential for the purposes of the present invention.

Figure 7:
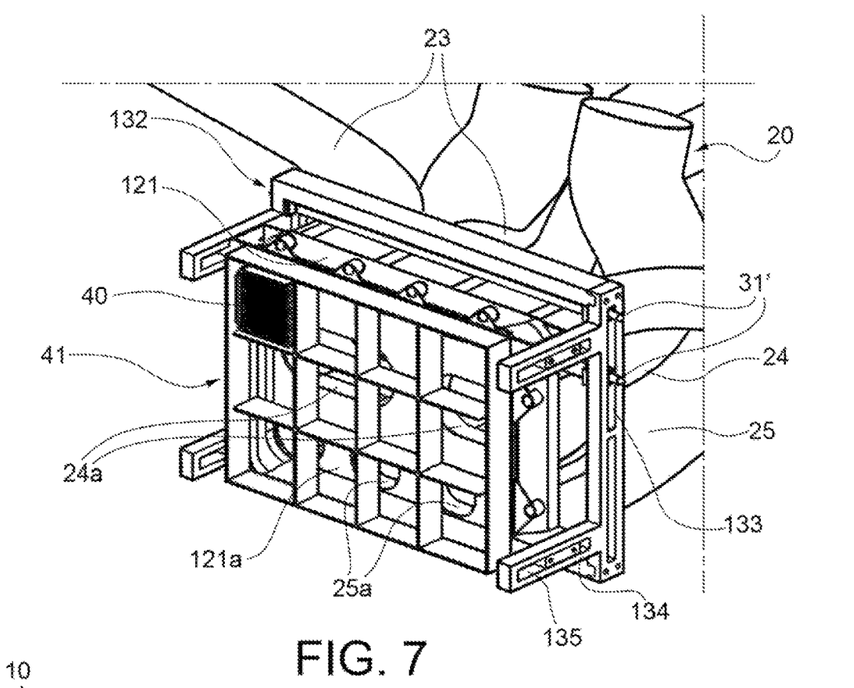
FIGS. 7 and 8 are respectively a perspective view and a section view of a further embodiment of the invention.
Figure 8:
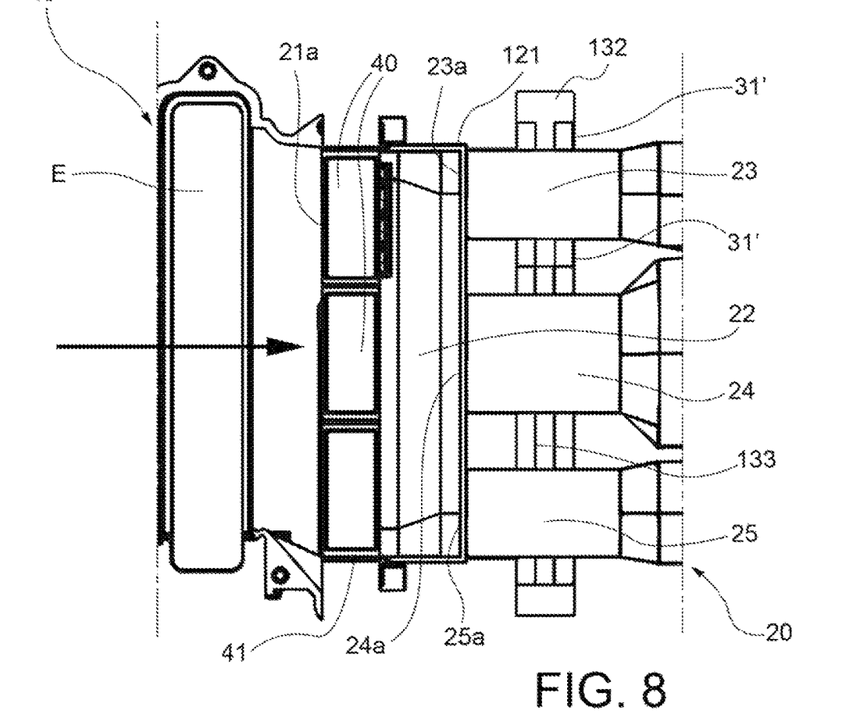

FIGS. 7 and 8 illustrate a further embodiment of the invention. The same reference numbers have been assigned to elements corresponding to those of the previous embodiments.

The embodiment of FIGS. 7-8 is substantially similar to that of FIG. 6, but it further comprises an array of heating elements 40, only one of which is represented for simplicity in FIG. 7. The heating elements 40 are carried by the main body 121 and can be controlled independently from each other. The heating elements 40 can be of the electric resistance type, for example with a positive temperature coefficient (PTC). However, the type of technology used for the heating elements is not essential for the purposes of the present invention.

In the illustrated example, the heating elements 40 are carried by a support frame 41, which is in turn fixed to the main body 121. The heating elements 40 can thus be arranged so as to form a two-dimensional or one-dimensional matrix. The array of heating elements 40 is placed opposite, i.e. upstream, the array of inlets 23a-25a of the distribution pipes 23-25 arranged on the plate 121a of the main body 121.

Having a structure with all the distribution pipes 23-25 arranged according to an orderly and planar scheme makes it possible to associate to the pipes an ordered set of heating elements, assigning an independent heating element, or a subset of independent heating elements, for each pipe. In this way it is possible to manage the air temperature in each individual pipe 23-25 by controlling the heating element(s) 40 associated with it.

As can be seen in FIG. 8, the air conditioning unit 10 connected upstream of the air distribution arrangement 20 can be simplified with respect to what has been previously described in relation to FIGS. 1 and 3. In fact, the unit can be without heaters, and therefore without dedicated channels and flaps for the air distribution between the various channels. In fact, in the air conditioning unit of FIG. 8 there is only one evaporator, indicated with E, as well as a fan (not shown) provided to generate an air flow towards the distribution arrangement 20.

There is therefore a greater compactness of the layout of the unit 10 with respect to the embodiment of FIGS. 1 and 3. With the configuration of FIGS. 7-8, air will always pass through the individual heaters 40 and it will be their piloting that sets the desired temperature in a dedicated way for each of the outlet conduits 23-25. This choice imposes an additional delta P in the case of flow in maximum cold ventilation, but the configuration described, equipped with flexible conduits and without the need to add rostrums, chimneys or air-guides, will however have an advantageous total pressure drop over conventional solutions.

Piloting temperature independently for each outlet also simplifies the achievement of the performances of temperature regulation linearity and stratification (temperature difference between different outputs, required for reasons of comfort). In addition to being easier to complete adjustments for these performances (it will be a question of developing a software algorithm) the performance level itself will be significantly higher than that of the classic modules, as it will no longer be necessary to accept compromises with respect to the specification.

Figure 9:
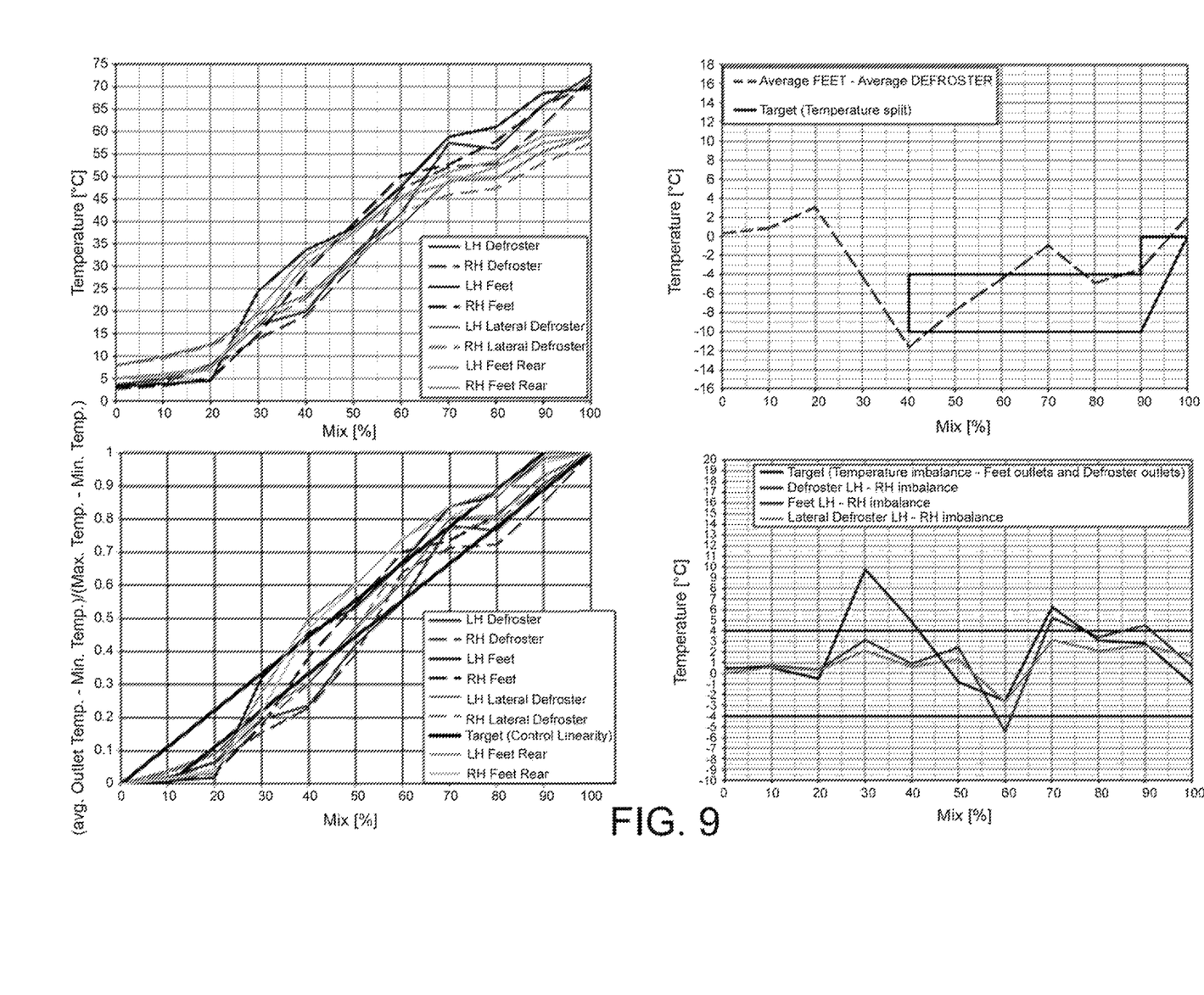
FIG. 9 shows graphs representing temperature regulation curves and stratification curves of a conventional air conditioning unit.

By way of example, FIG. 9 shows the temperature regulation linearity curves and the stratification curves of an air conditioning unit representative of the performance levels now available on the market. It can be seen that the mixing trend is linear but the individual curves of the individual outlets have deviations of different degrees, always controllable with difficulty or with remedies (ribs, air-guides, chimneys) which lead to an increase in overall pressure drops. In particular, the stratification curves highlight the difficulty of always remaining within the bands required by customer specifications.

It is to be understood that the present invention is not limited to the embodiments described and illustrated herein, but may be modified relating to the shape and arrangements of parts, construction and operation details, according to the numerous possible variants that will appear appropriate to those skilled in the art, without departing from the scope of protection as described and claimed herein.

What is claimed is:

1. An air distribution arrangement for an air conditioning unit, the air distribution arrangement comprising:
   a main body coupled to a housing of the air conditioning unit, and provided with a distribution chamber fluidically connected to at least one air transport conduit formed within the housing of the air conditioning unit,
   a plurality of distribution pipes connected to the main body and configured to be connected with respective air outlets for distributing air within a cabin of a vehicle, wherein each distribution pipe is flexible and at least in part inflatable due to an air flow within it, and
   a plurality of throttling members disposed such that they successively alternate with the distribution pipes, the throttling members being controllable to adjust air passage cross-section of the distribution pipes, to selectively close or open the distribution pipes,
   wherein each distribution pipe is interposed between a respective pair of throttling members, at least one of which is movable to selectively move the throttling members towards each other or move the throttling members away from each other, and
   wherein a single throttling member of the plurality of throttling members is configured to adjust air passage cross-section of two adjacent distribution pipes.

2. The air distribution arrangement of claim 1, wherein each throttling member of the plurality of throttling members is configured to engage a wall of a respective distribution pipe.

3. The air distribution arrangement of claim 2, wherein each throttling member of the plurality of throttling members is attached to the respective distribution pipe.

4. The air distribution arrangement of claim 1, wherein the main body is of rigid material and carries a frame on which at least one throttling member of the plurality of throttling members is mounted.

5. The air distribution arrangement of claim 4, wherein the at least one throttling member is slidably arranged along the frame.

6. The air distribution arrangement of claim 4, further comprising an array of heating elements carried by the main body and controllable independently from each other, the array of heating elements being placed in front of an array of inlets of the distribution pipes arranged on the main body.

7. An air conditioning unit comprising the air distribution arrangement of claim 1.

* * * * *